United States Patent [19]

Honda et al.

[11] Patent Number: 5,008,042
[45] Date of Patent: Apr. 16, 1991

[54] FLUORORESIN-CONTAINING COATING COMPOSITION AND USE THEREOF

[75] Inventors: Norimasa Honda, Ibaraki; Masahiro Sano, Minoo, both of Japan

[73] Assignee: Daikin Industries Ltd., Osaka, Japan

[21] Appl. No.: 113,122

[22] Filed: Oct. 27, 1987

[30] Foreign Application Priority Data

Oct. 28, 1986 [JP] Japan .................................. 61-257181

[51] Int. Cl.$^5$ ........................... H01B 1/20; C08K 9/02
[52] U.S. Cl. ..................................... 252/518; 252/520; 523/200
[58] Field of Search ................. 252/518, 520; 106/308 M, 499; 523/200, 204, 217

[56] References Cited

U.S. PATENT DOCUMENTS

| 4,373,013 | 2/1983 | Yoshizumi | 252/518 |
| 4,431,764 | 2/1984 | Yoshizumi | 252/418 |
| 4,482,476 | 11/1984 | Yoshimura et al. | 252/511 |
| 4,503,179 | 3/1985 | Yoshimura et al. | 524/262 |
| 4,752,415 | 6/1988 | Iwaskow et al. | 252/511 |

OTHER PUBLICATIONS

Derwent Abstracts, Abstract No. 80-02637c/02, "Grinding Material Production", Japanese Pat. J54150790-A, 11/27/79.

Primary Examiner—Paul Lieberman
Assistant Examiner—Christine A. Skane
Attorney, Agent, or Firm—Birch, Stewart, Kolasch & Birch

[57] ABSTRACT

A fluororesin-containing composition comprising a fluororesin, a fibrous material coated by an electrically conductive oxide, an acrylic resin and a liquid medium wherein the weight ratio of the fluororesin to the fibrous material is from 95:5 to 50:50, and the weight ratio of the fluororesin to the acrylic resin is from 100:0 to 85:15. The coating formed from the composition has good heat, chemical and weather resistance and non-tackiness properties.

9 Claims, 1 Drawing Sheet

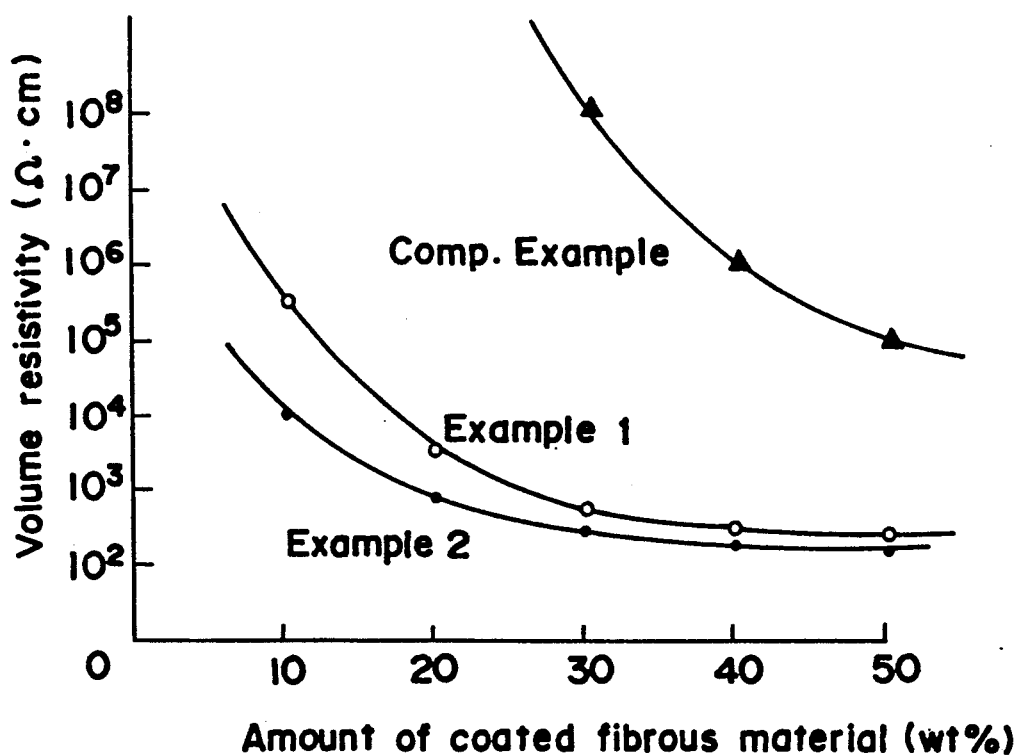
Figure

FLUORORESIN-CONTAINING COATING COMPOSITION AND USE THEREOF

BACKGROUND OF THE INVENTION

1. Field of the Invention

The present invention relates to a fluororesin-containing coating composition and the use thereof. More particularly, the present invention relates to a coating composition comprising a fluororesin, a fibrous material coated by an electrically conductive material, an acrylic resin and a liquid medium, which is suitable for forming a non-tacky, antistatic coating on a substrate.

2. Description of the Prior Art

A fluororesin coating is not only characterized with various desirable properties such as heat resistance, chemical resistance and weather resistance which are the inherent properties of the fluororesin but also non-tackiness, properties. Thus a fluororesin coating is useful for applications in which non-tackiness is required. However, since fluororesin is a good electrical insulator and easily electrostatically charged, a coating thereof is also easily electrostatically charged and absorbs dusts from the air, which is not acceptable for some applications. To overcome such a defect, it is proposed to add an electrically conductive material such as carbon black and metal powder to the fluororesin coating.

When carbon black is used as the electrically conductive material, the coating is black in color, which renders the coating impossible to freely color. When the coating containing carbon black is rubbed with another material, other material is blackened. Further, since carbon black easily agglomerates, it is necessary to disperse the coating composition containing the carbon black in a suitable mixing machinen, such as a ball mill for a long period of time in order to homogeneously disperse carbon black in the coating composition.

When the metal powder is used as the electrically conductive material, the conductivity of the coating does not increase proportionally the amount of the metal powder added. If a large amount of the metal powder is added to the coating composition, the stability of the composition is deteriorated and the mechanical strength of the coating is decreased.

SUMMARY OF THE INVENTION

One object of the present invention is to provide a fluororesin-containing composition which can impart antistatic property to a coating formed on a substrate.

Another object of the present invention is to provide a fluororesin-containing composition which does not suffer from the defects which are caused by the addition of the electrically conductive material to the composition, and does not deteriorate the inherent properties of the fluororesin.

According to the present invention, there is provided a fluororesin-containing composition comprising a fluororesin, a fibrous material coated by an electrically conductive oxide, an acrylic resin and a liquid medium wherein the weight ratio of the fluororesin to the fibrous material is from 95:5 to 50:50, and the weight ratio of the fluororesin to the acrylic resin is from 100:0 to 85:15.

DETAILED DESCRIPTION OF THE INVENTION

One of the characteristics of the present invention resides in the use of a fibrous material coated by an electrically conductive material such as stannic dioxide and diantimony trioxide as the electrically conductive material. Such electrically conductive material can impart electrical conductivity to a fluororesin coating in an amount which is smaller than the amount if a conventional electrically conductive material such as carbon black and the metal powder were used. Since a small amount of the electrically conductive material is contained in the coating, it can impart antistatic property to the coating without deteriorating the properties of the fluororesin. Since the electrically conductive material of the present invention is white, the coating composition is also white. Therefore, the composition can be colored by any of the suitable colorants.

Each particle of the fibrous material has a diameter of 0.01 to 10 micrometers and a length of 1 to 100 micrometers. Those having a larger aspect ratio (length/diameter) are preferred. Specific examples of the fibrous material are fibrous potassium titanate, fibrous silicon carbide, fibrous silicon nitride, fibrous $\alpha$-alumina, fibrous boron carbide, and the like. Among these examples, fibrous potassium titanate is preferred because of its high whiteness and good heat resistance.

The amount of the electrically conductive material is from 5 to 50% by weight, preferably from 10 to 30% by weight based on the total weight of the fluororesin and the electrically conductive material. When the amount of the electrically conductive material is less than 5% by weight, the fluororesin coating is not characterized with an antistatic property. When it is more than 50% by weight, evenness, non-tackiness and corrosion resistance of the coating are deteriorated.

According to the present invention, the addition of the electrically conductive material decreases the volume resistivity of the fluororesin coating and imparts the antistatic property to the coating. It has been found that the addition of an acrylic resin further decreases the volume resistivity of the fluororesin coating and improves its antistatic property. Namely, when the fluororesin-containing coating composition contains 15% or less, preferably 5 to 15% by weight of the acrylic resin based on the weight of the fluororesin, the antistatic property, of the composition is further improved. The acrylic resin may be any one of the known acrylic resins. Examples of the acrylic resins are polymethyl methacrylate, acrylate, polymethyl acrylate, polyethyl acrylate and the like.

The fluororesin to be used according to the present invention includes polytetrafluoroethylene, tetrafluoroethylene/perfluoroalkyl vinyl ether copolymer, tetrafluoroethylene/hexafluoropropylene copolymer and mixtures thereof.

The liquid medium may be any one of liquid mediums which are conventionally used for the preparation of the coating composition containing the fluororesin. Preferred examples of the liquid medium are water and organic solvents (benzene, toluene, xylene, etc.).

The coating composition of the present invention may further contain any of additives which are added to the conventional fluororesin-containing coating composition such as a pigment, a viscosity modifier and a dispersant.

The coating composition of the present invention is generally spray coated on a substrate, although it may be coated by brushing, impregnation, casting and the like.

The coating formed from the coating composition of the present invention has various preferred properties such as non-tackiness, heat resistance and chemical resistance which the fluororesin component inherently possesses and imparts antistatic property to the substrate. Further, advantageously, the coating composition of the present invention can be thickly coated. When the coating composition contains carbon black as the electrically conductive material, the thickness of the coating should be about 30 to 40 micrometers or less to prevent crack of the coating. According to the present invention, the coating composition can be coated at a thickness of about 100 micrometers without being caused to crack.

The coating composition may be used for coating various substrates, for example, a fixing heater roller or a pressure roller of a copying machine or a facsimile machine, a sizing roller for paper or fiber, a roller for food processing, a conveyer for conveying powder, a hopper, a shooter, and the like.

When the coating composition of the present invention is coated on the peripheral surface of a fixing heater roller, the roller has good heat resistance and nontackiness and does not suffer from stain. Thus, it has improved durability.

PREFERRED EMBODIMENTS OF THE INVENTION

The present invention will be hereinafter explained further in detail by following examples, in which % is by weight unless otherwise indicated.

EXAMPLE 1

By a mixing vessel equipped with mixing blades, fibrous potassium titanate covered by stannic dioxide and diantimony trioxide (fiber diameter: 0.3 to 0.6 μm, fiber length: 10 to 20 μm, volume resistivity: $10^2$ Ωcm) (FF-202 manufactured by Sumitomo Chemical) (40 g) as the electrically conductive material and a dispersant (40 g) containing nonionic surfactant (4.8 g) were mixed. To the mixture, an aqueous dispersion of polytetrafluoroethylene (solid content: 60%) (100 g is added and mixed to obtain a coating composition. In this example, the content of the electrically conductive material is 40% [weight of the electrically conductive material×100/(weight of the fluororesin +weight of the electrically conductive material)].

The obtained coating composition is coated on a glass plate and heated at 380° C. for 10 minutes to prepare a coating of about 20 μm in thickness. Its volume resistivity is measured.

In the same manner as above but changing the amount of the coated fibrous potassium titanate to 6.7 g (content of the electrically conductive material: 10%), 15 g (content of the electrically conductive material: 20%), 25.7 g (content of the electrically conductive material: 30%) or 60 g (content of the electrically conductive material: 50%), the coating is prepared and its volume resistivity is measured.

The results are shown in Figure.

When the coating has volume resistivity of not more than $10^7$ Ωcm, its antistatic performance is deemed to be sufficient. Therefore, the coating prepared from the coating composition of the present invention has satisfactory antistatic performance.

Example 2

In the same manner as in Example 1 but further using polymethyl acrylate (6 g) a coating is prepared on the glass plate and its volume resistivity is measured.

The results are also shown in FIGURE. These results shows that the addition of the acrylic resin further improves the antistatic performance of the fluororesin coating.

COMPARATIVE EXAMPLE 1

In the same manner as in Example 1 but using, as an electrically conductive material, mica particles having an average particle size of 10 μm which are covered by stannic dioxide and diantimony trioxide having volume resistivity of $10^3$ Ωcm (MEC-300 manufactured by Teikoku Kako), a coating is prepared on the glass plate and volume resistivity is measured. The results are shown in Figure.

EXAMPLE 3

A roller base member made of aluminum having an outer diameter of 40 mm and a length of 340 mm is used. After usual surface preparation of the roller base member for fluororesin coating (blast treatment and primer coating), a coating composition prepared in the same manner as in Example 1 is coated to form a coating having a thickness of about 30 μm.

EXAMPLE 4

In the same manner as in Example 3 but using a coating composition which was prepared in the same manner as in Example 1, a coated roller was prepared.

COMPARATIVE EXAMPLE 2

In the same manner as in Example 3 but using a coating composition which was prepared in the same manner as in Example 1 but using no electrically conductive material, a coated roller was prepared.

EXPERIMENTS

A peripheral surface of each of the roller produced in Examples 3 and 4 and Comparative Example 2 was rubbed with Nylon felt to electrostatically charge the roller. Then the surface electric potential was measured by a surface potentiometer. The results are show in following Table.

TABLE

| Example No. | Surface electric potential (V) |
|---|---|
| 3 | −44 |
| 4 | −35 |
| Comp. 2 | −1,050 |

The closer to zero the surface electric potential is, the less a toner adheres to the roller surface.

What is claimed is:

1. A fluororesin-containing coating composition comprising a fluororesin, a fibrous material selected from the group consisting of fibrous potassium titanate, fibrous silicon nitride, fibrous α-alumina and fibrous boron carbide coated by an electrically conductive oxide and having a diameter of 0.01 to 10 micrometers and a length of 1 to 100 micrometers, an acrylic resin selected from the group consisting of polymethyl methacrylate, polymethyl acrylate and polyethyl acrylate and a liquid medium wherein the weight ration of the fluororesin to the fibrous material is from 95:5 to 50:50, and the weight ratio of the fluororesin to the acrylic resin is from 100:0 to 85:15.

2. The fluorine-containing composition according to claim 1, wherein the fibrous material is fibrous potassium titanate.

3. The fluorine-containing composition according to claim 1, wherein the conductive oxide is stannic dioxide or diantimony trioxide.

4. The fluororesin-containing composition according to claim 1, wherein the amount of the electrically conductive oxide present is 5 to 50% by weight based on the total weight of the fluororesin and the electrically conductive oxide.

5. The fluororesin-containing composition according to claim 4, wherein the amount is 10% to 30% by weight.

6. The fluororesin-containing composition according to claim 1, wherein the fluororesin is polytetrafluoroethylene, tetrafluoroethylene/perfluoroalkyl vinyl ether copolymer, tetrafluoroethylene/hexafluoropropylene copolymer or mixtures thereof.

7. The fluororesin-containing composition according to claim 1, wherein the liquid medium is water or an organic solvent.

8. The fluororesin-containing composition according to claim 7, wherein the liquid medium is an organic solvent and is selected from the group consisting of benzene, toluene and xylene.

9. The fluororesin-containing composition according to claim 1, which comprises a pigment, a viscosity modifier, a dispersant or a mixture thereof.

* * * * *